(12) United States Patent
Calderon

(10) Patent No.: US 9,468,888 B2
(45) Date of Patent: Oct. 18, 2016

(54) SYSTEM AND METHODS FOR REMOVING CONTAMINANTS FROM GAS EFFLUENTS

(71) Applicant: (E)MISSION CONTROL TECHNOLOGIES, LLC, New York, NY (US)

(72) Inventor: Juan Jose Calderon, Centinela Del. Coyoacan Z.C. (MX)

(73) Assignee: (E)Mission Control Technologies, LLC, New York, NY (US)

( * ) Notice: Subject to any disclaimer, the term of this patent is extended or adjusted under 35 U.S.C. 154(b) by 212 days.

(21) Appl. No.: 14/474,489

(22) Filed: Sep. 2, 2014

(65) Prior Publication Data

US 2015/0068396 A1   Mar. 12, 2015

Related U.S. Application Data

(60) Provisional application No. 61/875,212, filed on Sep. 9, 2013.

(51) Int. Cl.
*B01D 53/75* (2006.01)
*B01D 53/32* (2006.01)
(Continued)

(52) U.S. Cl.
CPC ............. *B01D 53/75* (2013.01); *B01D 53/007* (2013.01); *B01D 53/265* (2013.01); *B01D 53/323* (2013.01); *B01D 53/78* (2013.01);
(Continued)

(58) Field of Classification Search
CPC combination set(s) only.
See application file for complete search history.

(56) References Cited

U.S. PATENT DOCUMENTS

| | | | |
|---|---|---|---|
| 3,994,691 | A | 11/1976 | Ross et al. |
| 4,170,447 | A | 10/1979 | Goldstein et al. |

(Continued)

FOREIGN PATENT DOCUMENTS

| | | |
|---|---|---|
| EP | 0385310 A | 9/1990 |
| JP | 08038934 A | 2/1996 |
| JP | 11197543 A | 7/1999 |

*Primary Examiner* — Duane Smith
*Assistant Examiner* — Sonji Turner
(74) *Attorney, Agent, or Firm* — Baker & Hostetler LLP

(57) ABSTRACT

The present invention is directed to apparatuses and methods for pollution abatement. One embodiment provide methods of eliminating pollutants from an incoming optionally high temperature gaseous effluent stream, each method comprising directing the gaseous effluent stream sequentially through: (a) a sufficient volume of an aqueous liquid in a thermal shock vessel, such that the temperature of the gaseous effluent stream exiting the volume of liquid is in a range of about 5° C. to about 30° C., said liquid acting as filter to remove water, particles, soluble organic species, or a combination thereof from the gaseous stream; and one or more of: (b) an electronic bombardment module wherein the gaseous stream is ionized, forms molecular agglomerates, or both; (c) a magnetic rearrangement module, operating with a magnetic field in a range of about 0.5 to about 3 milliteslas; and (d) an electrostatic filter; so as to provide a pollution-reduced gas stream; wherein the optionally high temperature gaseous effluent stream initially contains impurities which include aromatic and non-aromatic hydrocarbons, carbon dioxide, carbon monoxide, oxides of nitrogen, oxides of sulfur, fluorocarbons or fluoroethers, or any combination thereof, along with high levels of humidity, solid or liquid particles, soluble or non-soluble organic species, or a combination thereof.

29 Claims, 7 Drawing Sheets

(51) Int. Cl.
  *B01D 53/00* (2006.01)
  *B01D 53/26* (2006.01)
  *B01D 53/78* (2006.01)

(52) U.S. Cl.
  CPC .......... *B01D 2257/2066* (2013.01); *B01D 2257/302* (2013.01); *B01D 2257/404* (2013.01); *B01D 2257/50* (2013.01); *B01D 2257/702* (2013.01); *B01D 2257/708* (2013.01); *B01D 2257/80* (2013.01); *B01D 2257/90* (2013.01); *B01D 2259/812* (2013.01); *B01D 2259/814* (2013.01); *Y02C 20/30* (2013.01)

(56) References Cited

U.S. PATENT DOCUMENTS

| | | |
|---|---|---|
| 4,225,323 A | 9/1980 | Zarchy et al. |
| 4,375,982 A | 3/1983 | Chitil |
| 4,979,364 A | 12/1990 | Fleck |
| 5,492,677 A | 2/1996 | Yoshikawa |
| 5,759,239 A | 6/1998 | Yu |
| 5,792,238 A | 8/1998 | Johnson et al. |
| 5,968,231 A | 10/1999 | Parmentier et al. |
| 6,149,713 A | 11/2000 | Ochi et al. |
| 6,203,710 B1 | 3/2001 | Woodbridge |
| 6,251,281 B1 | 6/2001 | Ohkawa |
| 6,709,490 B1 | 3/2004 | Calderon De Los Santos |

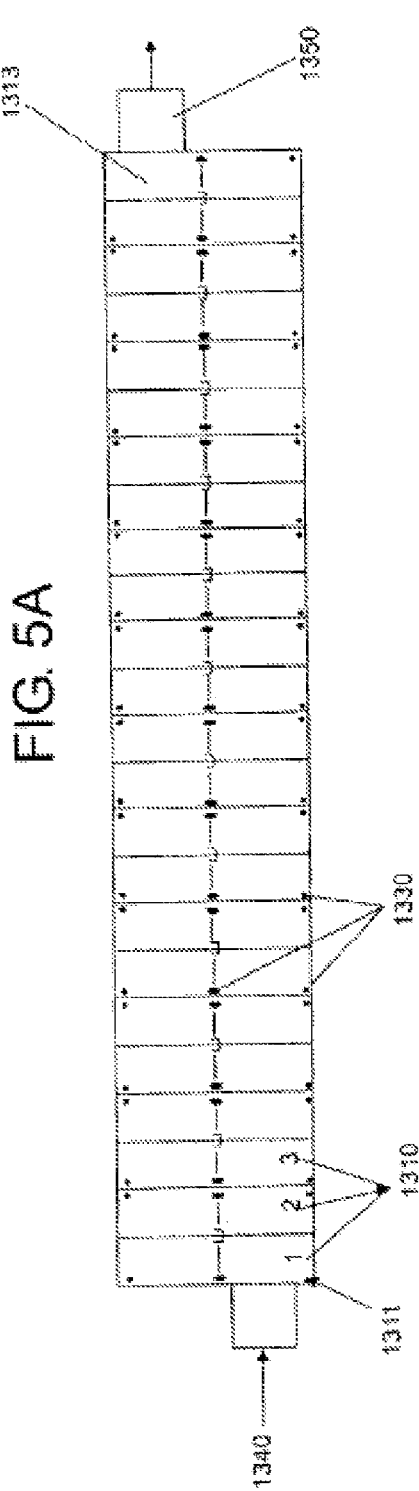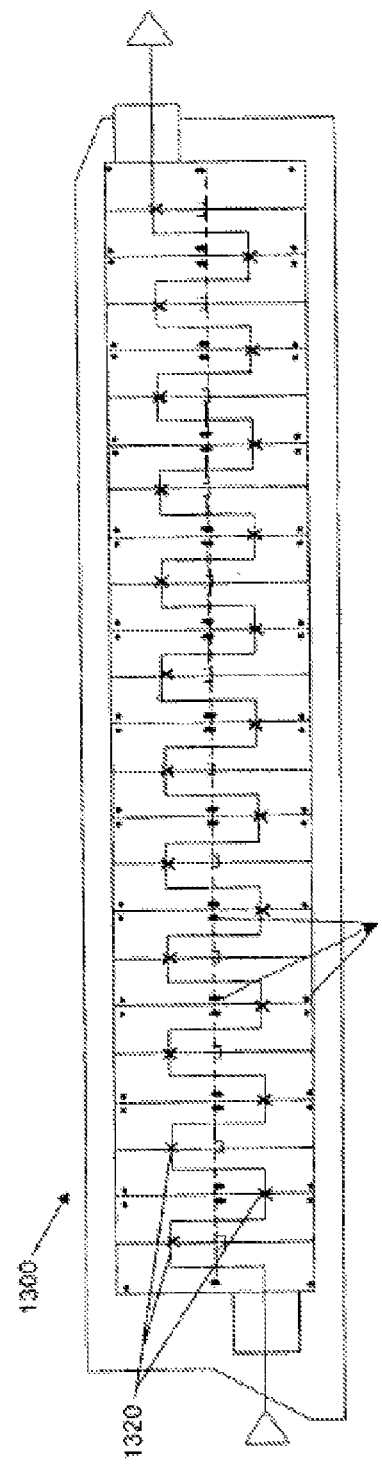

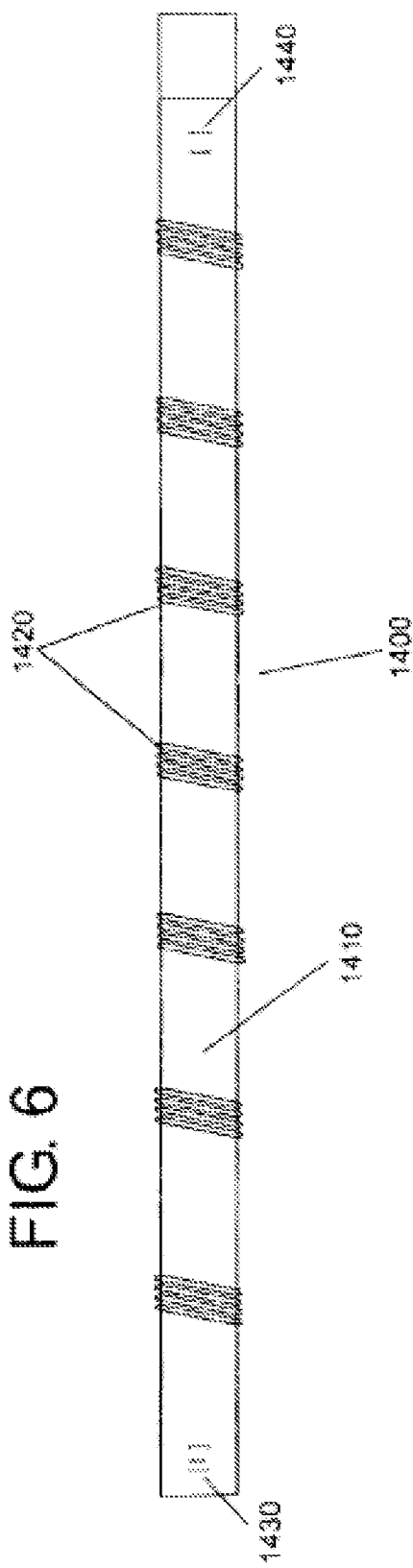

SYSTEM AND METHODS FOR REMOVING CONTAMINANTS FROM GAS EFFLUENTS

CROSS REFERENCE TO RELATED APPLICATIONS

This application claims the benefit of priority to U.S. Patent Application Ser. No. 61/875,212, filed Sep. 9, 2013, the contents of which is incorporated by reference in its entirety for any and all purposes.

TECHNICAL FIELD

The present invention relates to methods and apparatus for abating pollutants from gaseous effluent streams.

BACKGROUND

Pollution is a problem that has plagued mankind since he began to modify his environment and became particularly problematic beginning with the industrial revolution. Since the early 1990s, there has been considerable discussion as to the true costs of pollution in terms of its effects on health and productivity, and there is considerable agreement on the need for revised technology to diminish emissions from mobile and stationary sources. In particular, humans continue to seek ways to mitigate pollution streams either by recycling or by finding ways to dispose of wastes in ways less damaging to the environment.

The present inventions are directed to such new solutions.

SUMMARY

Various embodiments of the present invention provide systems for the elimination of pollutants from an incoming, optionally high temperature, gaseous effluent stream, each system configured to direct the gaseous effluent stream sequentially through
  (a) a thermal shock vessel comprising an aqueous liquid having a mean temperature in a range of about 5° C. to about 30° C.; and then
  (b) a Device for ElectroMagnetic Irradiation (DEMI);
  so as to provide a pollution-reduced gas stream.

Additional embodiments provide systems for the elimination of pollutants from an incoming, optionally high temperature, gaseous effluent stream, each system configured to direct the gaseous effluent stream sequentially through:
  (a) a thermal shock vessel comprising an aqueous liquid having a mean temperature in a range of about 5° C. to about 30° C.;
  (b) an electronic bombardment module, comprising a plurality of hermetically adjoining chambers serially interconnected by means of a plurality of flow restrictors, each chamber comprising at least one set of electrodes capable of delivering a voltage in a range of from about 500 to about 80,000 voltages and an associated direct current in a range of about 2 milliamps to 2 amperes; and
  (c) a magnetic rearrangement module, which when operating contains a magnetic field in a range of about 0.5 milliteslas to about 3 milliteslas; and
  (d) an electrostatic filter;
  so as to provide a pollution-reduced gas stream;
  wherein the optionally high temperature gaseous effluent stream initially contains non-aromatic hydrocarbons and heteroatom-containing hydrocarbons (including dioxins), aromatic and polyaromatic hydrocarbons and heteroatom-containing hydrocarbons (including furans and thiophenes), carbon dioxide, carbon monoxide, oxides of nitrogen, oxides of sulfur, sulfides, fluorocarbons or fluoroethers, or any combination thereof, along with high levels of water (as stream, vapor, or droplets), solid or liquid particles, soluble or non-soluble organic species, volatile organic compounds, odors, or a combination thereof;
  wherein the thermal shock vessel is capable of reducing the temperature of the gaseous stream to ambient or near ambient temperatures and is capable of acting as a filter to remove water, particles, soluble organic species, or a combination thereof, and whereupon the gas stream exiting the thermal shock vessel has a temperature comparable to that of the mean temperature of the aqueous liquid;
  wherein the voltage and current applied to the gaseous stream in the electronic bombardment is sufficient to cause molecules in the gaseous stream to ionize, form molecular agglomerates, or both; and
  wherein the magnetic field applied to the gaseous stream in the magnetic rearrangement module is sufficient to prepare the gaseous stream for separation and removal of the ionized/agglomerated molecules in the electrostatic filtration module.

Still other embodiments provide methods of eliminating pollutants from an incoming optionally high temperature gaseous effluent stream, each method comprising directing the gaseous effluent stream sequentially through:
  (a) a sufficient volume of an aqueous liquid in a thermal shock vessel, such that the temperature of the gaseous effluent stream exiting the volume of liquid is in a range of about 5° C. to about 30° C., said liquid acting as filter to remove water, particles, soluble organic species, or a combination thereof from the gaseous stream;
  (b) an electronic bombardment module wherein the gaseous stream is ionized, forms molecular agglomerates, or both;
  (c) a magnetic rearrangement module, operating with a magnetic field in a range of about 0.5 to about 3 milliteslas; and
  (d) an electrostatic filter;
  so as to provide a pollution-reduced gas stream;
  wherein the optionally high temperature gaseous effluent stream initially contains non-aromatic hydrocarbons and heteroatom-containing hydrocarbons (including dioxins), aromatic and polyaromatic hydrocarbons and heteroatom-containing hydrocarbons (including furans and thiophenes), carbon dioxide, carbon monoxide, oxides of nitrogen, oxides of sulfur, sulfides, fluorocarbons or fluoroethers, or any combination thereof, along with high levels of water (as stream, vapor, or droplets), solid or liquid particles, soluble or non-soluble organic species, volatile organic compounds, odors, or a combination thereof.

The general description and the following detailed description are exemplary and explanatory only and are not restrictive of the invention, as defined in the appended claims. Other aspects of the present invention will be apparent to those skilled in the art in view of the detailed description of the invention as provided herein.

BRIEF DESCRIPTION OF THE DRAWINGS

The present application is further understood when read in conjunction with the appended drawings. For the purpose of illustrating the subject matter, there are shown in the drawings exemplary embodiments of the subject matter; however, the presently disclosed subject matter is not limited to the specific methods, devices, and systems disclosed. In addition, the drawings are not necessarily drawn to scale. In the drawings:

FIG. 5A is an exemplary side view of one embodiment of the electronic bombardment module of the apparatus in FIG. 2.

FIG. 5B is an exemplary top plan view of one embodiment of the electronic bombardment module of FIG. 4A.

FIG. 6 is an exemplary side view of one embodiment of the magnetic molecular rearrangement module of the apparatus in FIG. 4.

DETAILED DESCRIPTION OF ILLUSTRATIVE EMBODIMENTS

Figure 1:
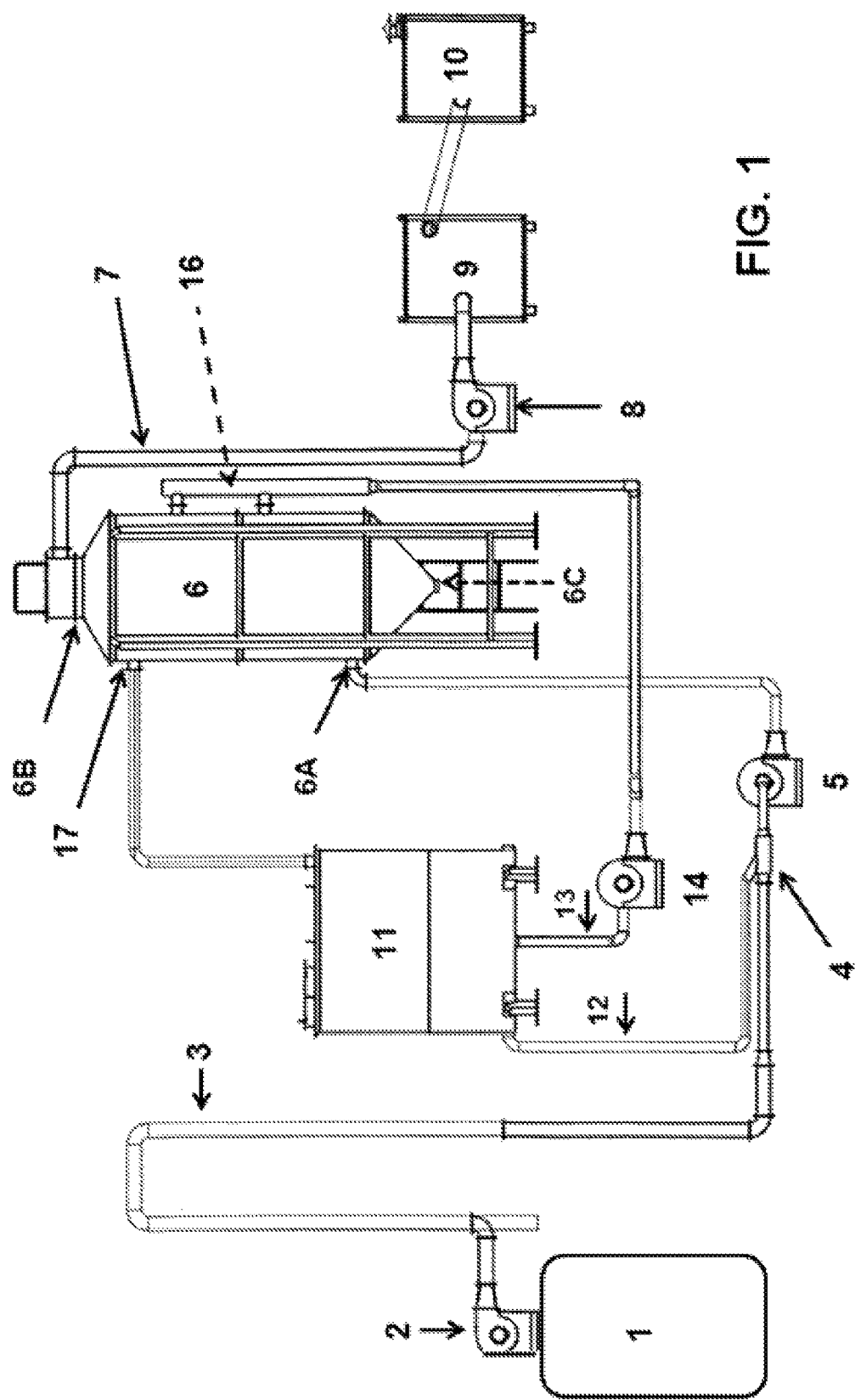
FIG. 1 is a schematic representation of one embodiment of the present invention.

The present invention may be understood more readily by reference to the following description taken in connection with the accompanying Figures and Examples, all of which form a part of this disclosure. It is to be understood that this invention is not limited to the specific products, methods, conditions or parameters described and/or shown herein, and that the terminology used herein is for the purpose of describing particular embodiments by way of example only and is not intended to be limiting of any claimed invention. Similarly, unless specifically otherwise stated, any description as to a possible mechanism or mode of action or reason for improvement is meant to be illustrative only, and the invention herein is not to be constrained by the correctness or incorrectness of any such suggested mechanism or mode of action or reason for improvement. Throughout this text, it is recognized that the descriptions refer to compositions and methods of making and using said compositions. That is, where the disclosure describes and/or claims a feature or embodiment associated with a system or apparatus or a method of making or using a system or apparatus, it is appreciated that such a description and/or claim is intended to extend these features or embodiment to embodiments in each of these contexts (i.e., system, apparatus, and methods of using).

In the present disclosure the singular forms "a," "an," and "the" include the plural reference, and reference to a particular numerical value includes at least that particular value, unless the context clearly indicates otherwise. Thus, for example, a reference to "a material" is a reference to at least one of such materials and equivalents thereof known to those skilled in the art, and so forth.

When a value is expressed as an approximation by use of the descriptor "about," it will be understood that the particular value forms another embodiment. In general, use of the term "about" indicates approximations that can vary depending on the desired properties sought to be obtained by the disclosed subject matter and is to be interpreted in the specific context in which it is used, based on its function. The person skilled in the art will be able to interpret this as a matter of routine. In some cases, the number of significant figures used for a particular value may be one non-limiting method of determining the extent of the word "about." In other cases, the gradations used in a series of values may be used to determine the intended range available to the term "about" for each value. Where present, all ranges are inclusive and combinable. That is, references to values stated in ranges include every value within that range.

It is to be appreciated that certain features of the invention which are, for clarity, described herein in the context of separate embodiments, may also be provided in combination in a single embodiment. That is, unless obviously incompatible or specifically excluded, each individual embodiment is deemed to be combinable with any other embodiment(s) and such a combination is considered to be another embodiment. Conversely, various features of the invention that are, for brevity, described in the context of a single embodiment, may also be provided separately or in any sub-combination. Finally, while an embodiment may be described as part of a series of steps or part of a more general structure, each said step may also be considered an independent embodiment in itself, combinable with others.

When a list is presented, unless stated otherwise, it is to be understood that each individual element of that list, and every combination of that list, is a separate embodiment. For example, a list of embodiments presented as "A, B, or C" is to be interpreted as including the embodiments, "A," "B," "C," "A or B," "A or C," "B or C," or "A, B, or C."

The present invention is directed to eliminating pollutants from an incoming gaseous effluent streams, including but not limited to those originating from, and having fluid communication between the inventive systems and, the exhaust of animal processing units; cement processing units; chemical processing plants; hospitals or clinics; mobile (e.g., automobile exhausts) or stationary chimneys; coal, fuel oil, or wood burning boilers or plants; commercial kitchens; power plants (coal or otherwise); petrochemical production facilities; pulp and paper production facilities; semiconductor processing units; metallurgical smelting units; sugar processing plants; trash or other organic incineration units; or wastewater or sewage management plants. Streams from these sources are typically, but not always, exhausted at high temperatures, contain aromatic and non-aromatic hydrocarbons and heteroatom-containing hydrocarbons, carbon dioxide, carbon monoxide, oxides of nitrogen, oxides of sulfur, sulfides, fluorocarbons or fluoroethers, or any combination thereof, along with high levels of humidity or even water droplets, solid or liquid particulate matter, soluble or non-soluble organic species (including odorants or hazardous biomaterials), or combinations thereof. In some cases, the gaseous effluent stream may be exhausted from the pollution source or enter the inventive systems at temperatures in a range of from about 25° C. to about 250° C.; in other cases, the streams are exhausted from the pollution source at high temperatures, high humidity, or both. The term "high temperature," as used herein, refers to a temperature in excess of 80° C., for example in a range of from about 80° C. to about 250° C. or from about 100° C. to about 250° C. Unless otherwise stated, the term "high humidity," refers to a relative humidity (at temperature) of at least 50%, relative to saturated vapor content. Additional embodiments provide that the high temperature, high humidity contains humidity levels at the temperature in a range of from about 60%, 70%, 80%, or 90% to about 100%, 95%, 90%, 85%, or 80%, relative to the saturated vapor content at the temperature of the gas stream. It should be appreciated that the water content of even a 100° C. gas stream having 60% relative humidity is significantly higher than a 20° C. gas stream having 100% relative humidity. The terms "particles" or "particulate matter" typically refers to solids or liquids, whose particle sizes are greater than about 25 microns (for example to about 10,000 microns), though the present methods are effective at removing particles having sizes as low as 1 micron or 250 nm or 100 nm. Depending on the source of the effluent streams, the particles may comprise, for example, carbon, polycondensed aromatics, metals or metalloids, metal or metalloid oxides, high molecular weight organic hydrocarbons and/or heteroatom-containing hydrocarbons, amines, acids, water droplets, or any combination thereof, though the methods and apparatus are not necessarily limited to these materials.

Certain embodiments of the present invention include systems for the elimination of such pollutants from incoming (optionally high temperature) gaseous effluent streams, each system configured to direct the gaseous effluent stream sequentially through (a) a thermal shock vessel comprising an aqueous liquid having a mean temperature in a range of about 5° C. to about 30° C.; and then (b) a Device for ElectroMagnetic Irradiation ("DEMI system") so as to provide a pollution-reduced gas stream. The term "pollution-reduced stream" connotes a gas stream where at least 90% of at least one contaminate in the incoming optionally high temperature gaseous effluent stream is removed by the apparatus (or method). Additional specific embodiments related to reductions are described infra.

As used herein, the term "optionally high temperature" refers to individual embodiments wherein the incoming gaseous effluent stream is either at high temperature (where "high temperature" is defined herein) or not. That is, the DEMI-TSS system can be applied effectively to gaseous effluent streams of any practical temperature, though the Thermal Shock System is especially useful in the treatment of the high temperature streams.

As used herein, the terms "DEMI system" or "DEMI apparatus" refer to a system or apparatus having at least modules providing tandem electronic bombardment and magnetic rearrangement; these systems or apparatus may also comprise at least one electrostatic filter. Many of the elements of the DEMI system have been described previously in U.S. Pat. No. 6,709,490 (the '490 patent), and each of the configurations described in the '490 patent may be considered additional representations of the DEMI system. This '490 patent showed the surprising synergy in purifying gaseous waste streams by the tandem implementation of the two physical principles of electronic bombardment and electrostatic interaction, directed to produce changes in the molecules comprising a gas stream. In such a configuration, there can be achieved a higher retention and decomposition of pollutant particles and molecules suspended in such gas stream than those obtained by either means of the known techniques alone.

However, the '490 patent failed to teach both the sensitivity of the system to extraneous incoming particulate matter or the improvements in efficiency to be had in reducing the incoming water levels in the gaseous streams. It is now recognized that high levels of water or particulate matter entering DEMI systems have a deleterious effect on the long-term performance and efficiency of such systems, a feature not previously recognized or reported. In practice, the present inventors discovered that by controlling incoming water and particulates to levels not previously appreciated, dramatic and surprising improvements in both efficiency and especially unit longevity can be realized. In certain embodiments, the effectiveness of the DEMI system can be surprisingly improved by treating the incoming (in some cases, high temperature) gaseous effluent stream with a Thermal Shock System ("TSS"), the specifics of which are described infra.

One such non-limiting embodiment of the improved overall system (described generally herein as a "TSS-DEMI system") is shown in FIG. 1. It should be appreciated that FIG. 1 discloses a wide range of elements, not each of which is necessarily required to be within the scope of any individual claim, and the reader is directed to the claims for that scope. That being said, the general elements of the DEMI-TSS system in this embodiment include the Thermal Shock System vessel 6, and at least one DEMI system (in FIG. 1, element 9 is intended to show an exemplary preparative DEMI unit and element 10 is intended to show an exemplary second, resolution DEMI unit). In FIG. 1, element 1 represents a pollution source (as further described herein), elements 2 and 3 represent a positive ventilator pump and pollution gas duct conduit, respectively, for transporting an incoming, optionally high temperature, gaseous effluent stream from the pollution source 1, in this case, though a junction unit 4 and water pump 5 to the bottom of the Thermal Shock System vessel 6 at 6A. The gaseous stream exits the Thermal Shock System vessel 6 through a gas outlet 6B, passes through a hypothermal volume injection duct 7, through another positive pressure ventilator 8 into the DEMI systems 9 and 10.

Figure 2:
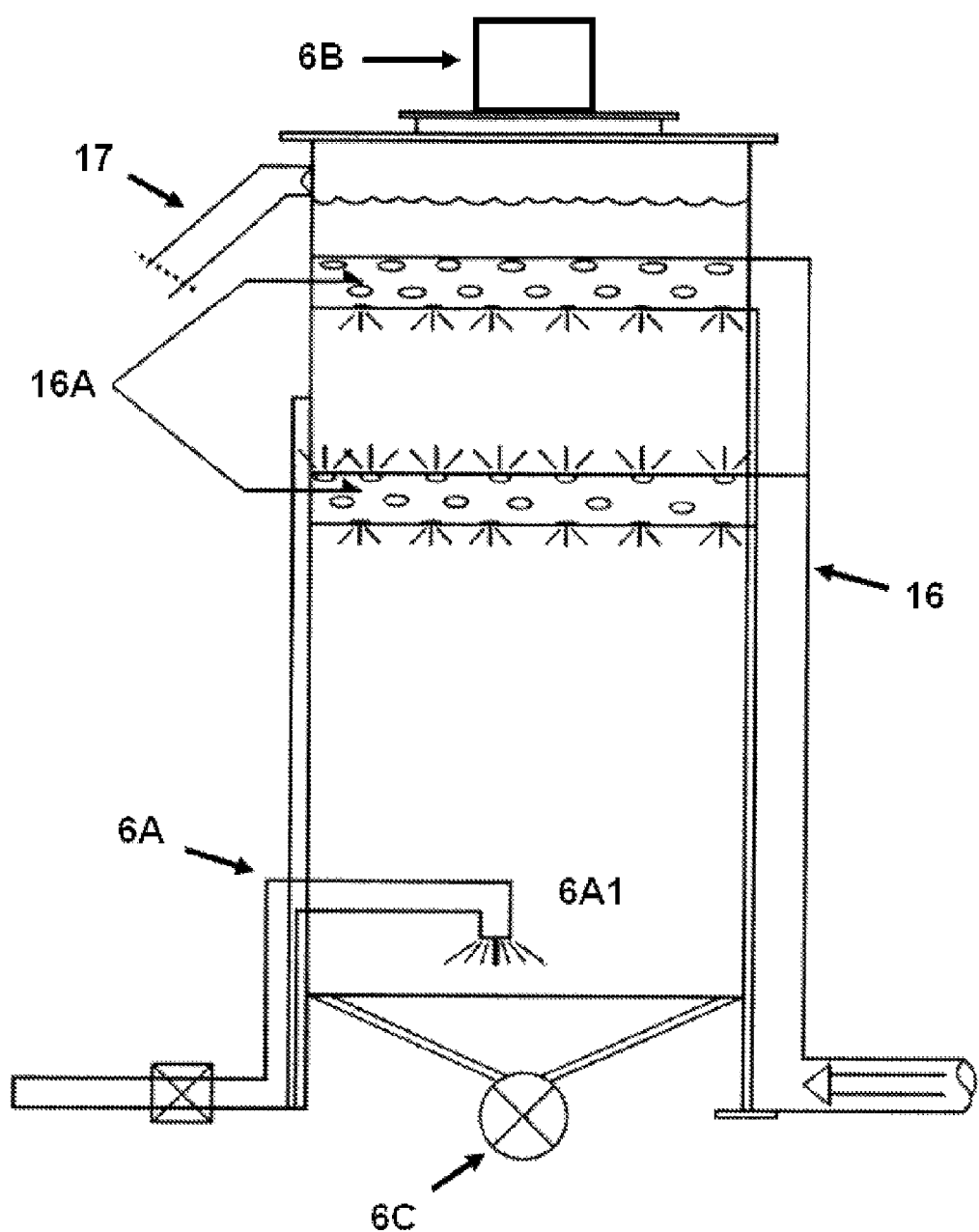
FIG. 2 is an expanded view of one embodiment of the Thermal Shock System vessel shown in FIG. 1.

In some embodiments, the Thermal Shock System provides a vessel 6 of aqueous liquid through which the optionally high temperature gaseous effluent stream passes. During this passage, the gaseous effluent stream may be significantly cooled and the aqueous liquid extracts most of the water and particulates entrained or trapped within the gaseous stream. As shown in the embodiment depicted in FIGS. 1 and 2, the vessel may be configured to be vertically oriented having top and bottom ends, comprises a gas inlet 6A and gas outlet 6B, and is configured to introduce the gaseous effluent stream to the vessel through the gas inlet 6A at a position proximate to the bottom end of the vessel and to remove the gaseous effluent stream from the gas outlet 6B at a position proximate to the top end of the vessel (as shown in FIG. 2, in one embodiment, the inlet valve directs the incoming gas downward in the vessel, 6A1). In the context of the positioning of the gas inlet and outlet, unless otherwise stated, the term "proximate" is intended to connote a distance that is nearer from the respective end than the opposite end (for example, "proximate to the bottom" connotes a vertical position closer to the bottom than to the top end of the vessel). Additional independent embodiments provide that the term "proximate" refers to a position that is within 10%, 20%, or 30% of the respective end, relative to the entire vertical distance of the vessel.

The gas stream, then, enters the vessel, passes up through the aqueous liquid in the vessel, and exits the vessel from at least one gas outlet positioned proximate to the top end of the vessel. While this configuration allows for gravity to assist in the movement of the gas through the liquid, other configurations are also possible, for example horizontal or mixed horizontal-vertical flow arrangement. Further, while not shown in FIG. 1, certain internal features may be employed within the vessel, either alone or in combination with one another, to improve the intermixing of the gas and the liquid, during the former's passage through the latter. For example, multiple gas inlets may be positioned radially around and at multiple height positions within the vessel.

Further, gas sparger(s) may be employed at the at least one gas inlet to provide for more intimate mixing between the gas and liquid. Additionally, the vessel may be fitted with internal baffles so as to provide a more serpentine pass of the gas through the liquid. Stirrers or axially positioned liquid inlet portals 16 (discussed further below) may provide for radial movement of the gas through the liquid. Such features which improve the efficiency of mixing may provide the design engineer with options for reducing the height of the vessel, both for cost and height constraints within the facility in which such a Thermal Shock System vessel 6 is housed.

The Thermal Shock System vessel 6 may also contain other features which are useful in maintaining and operating the system. In addition to a tandem Hypothermic Reactor System (HR System) 11 discussed below, the vessel may contain computer driven systems and sensors for monitoring and controlling the temperatures and particulate levels (derived from the incoming gas streams) in the vessel. The vessel 6 itself may be configured to have a fustrum-shaped tapering bottom, having a releasable opening 6C for removing or passing liquids, solids, or sludge (e.g., resulting from the removal or particulates from the gas). Depending on the source of the gaseous effluent stream, such solids or sludge may be recycled into the production process or provide sources of materials for beneficial purposes (e.g., fertilizers or feed additives).

It should be also appreciated that the Thermal Shock System, with or without the Hypothermic Reactor System, may also be operated as a stand-alone system—i.e., without necessarily requiring the DEMI system.

To this point, the liquid contained with vessel 6 has been described as an "aqueous liquid." Unless otherwise specified, the term "aqueous liquid" refers to a liquid containing at least about 90 wt % water, but additional embodiments provide that the liquid contains at least 50 wt %, 60 wt %, 70 wt %, 80 wt %, or 95 wt % and up to 100 wt % water. Water itself is especially preferred for its excellent heat transfer and capacity characteristics and cost, but in some cases it may be desirable to add other materials to the water to enhance these and other performance properties. For example, it may be useful to add certain salts or glycols (including ethylene or polyalkylene glycols) to improve the heat transfer of the liquid, resist corrosion, depress the vapor pressure of the liquid, or any combination thereof.

Figure 3:
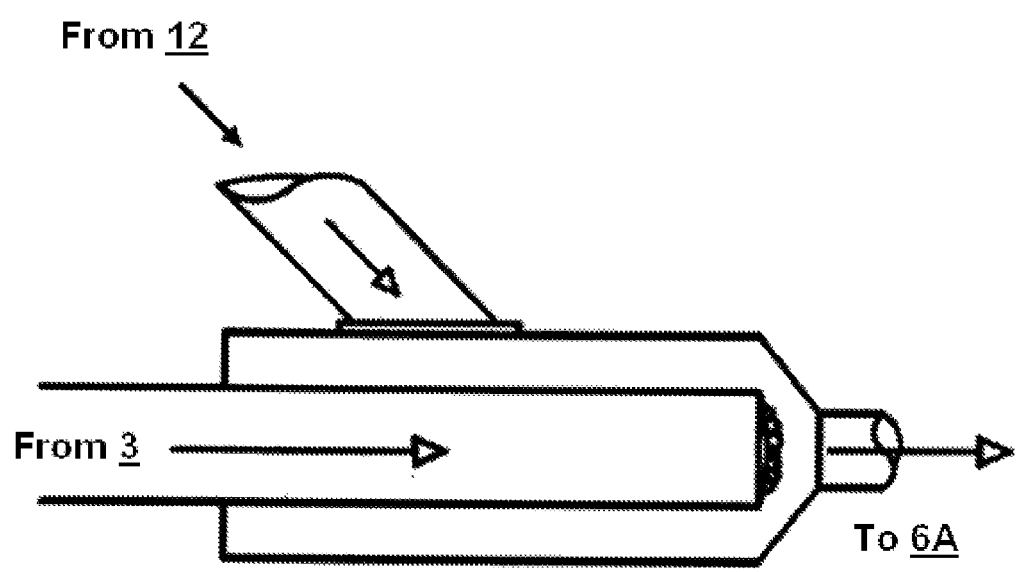
FIG. 3 is an expanded view of one embodiment of the junction mixer apparatus shown in FIG. 1.

Also in FIG. 1, elements 11-17 represent specific embodiments related to a Hypothermic Reactor System (HR System) which may be used in conjunction with the Thermal Shock System vessel 6, so as to maintain a constant source of low temperatures aqueous liquid within the vessel. This Hypothermic Reactor System may comprise at least one hypothermal reactor 11 having at least two exit conduits, 12 and 13. The hypothermal reactor may be viewed as a heat exchanger for the Thermal Shock System, and in fact may optionally beneficially contain additional cooling units. Conduit 12 provides cooled aqueous liquid to the junction unit 4, where it is mixed or coupled with the incoming effluent gas stream before entering the Thermal Shock System vessel 6 at 6A. This junction unit 4 may be configured to provide laminar or turbulent vortex mixing of the incoming effluent gas stream with hypothermic aqueous liquid prior to entering the gas inlet 6A of the Thermal Shock System vessel 6 (see, e.g., FIG. 3).

Conduit 13 provides a source of cooled aqueous liquid which is pumped by another water pump 14 through at least one conduit 15 and delivered into at least one liquid inlet portal 16 into the upper half of vessel 6. The at least one liquid inlet portal 16 may be positioned at any vertical or radial position or positions within the vessel 6, but it is preferred that at least one of these liquid inlet portals 16 be positioned in the upper half of the vessel (where upper and lower halves are distinguished by a hypothetical mid-volume level of the vessel). At least one of these liquid inlet portals may be configured to direct the incoming hypothermic aqueous liquid radially or axially, up or down, or when multiple inlet portals are present, in any combination of these radial or axial directions. In some embodiments, at least one liquid inlet portal 16 is in fluid communication with at least one liquid distributor device 16A, which extends into the central portion of the Thermal Shock System vessel 6, as shown in FIG. 2. Again, such a configuration provides an efficient "blanket" of hypothermic liquid, through which the gas must pass before exiting the Thermal Shock System vessel 6.

The Thermal Shock System vessel 6 may also have at least one liquid outlet overflow portal 17, said outlet overflow portal configured to remove excess low temperature aqueous liquid from said vessel and return it to the hypothermal reactor 11. At least one outlet portal may be configured at any vertical position with the vessel, but is preferably in fluid communication with the upper half of the vessel, and more preferably positioned at an elevation higher than that of the at least one liquid inlet portal 16.

It should be appreciated that when the incoming gaseous effluent stream is a high temperature stream, the Thermal Shock System vessel 6 alone, and especially in tandem with the Hypothermic Reactor System (HR System), contains thermal gradients, such that the liquid and gas exiting the vessel are substantially cooler than the gas entering the vessel. As described above, the introduction of the cooled aqueous liquid near the top of the vessel provides a layer through which the gas must eventually pass. The terms "low temperature," "cooled," or "hypothermic" used in conjunction with the aqueous liquid connotes temperatures below 30° C., and preferably in a range of from about 0° C. or 5° C. to about 10° C., 15° C., 20° C., 25° C., or 30° C. It should be appreciated that, especially in the presence of added vapor pressure depressants, lower temperatures are preferred at least because the water content of the exiting gas stream is defined, in part, by the vapor pressure of water at its exiting temperature. U.S. Pat. No. 6,709,490 described the DEMI system as requiring an incoming gas stream temperature of 30° C. to 50° C., but the present inventors have since found that even lower temperatures (e.g., 20° C.) provide unexpected benefits, possibly due at least to the reduced water vapor levels contained in the incoming (to the DEMI system) gas streams.

For the sake of completeness, the various pumps or pumping devices shown in FIG. 1 may be described as in Table 1. It should be appreciated that the pumping devices shown in FIG. 1 are specific individual/illustrative embodiments, and the invention is not limited by the specific position or presence of any given device.

TABLE 1

Description of pumping devices shown in FIG. 1*

| Pump | Type(s) | Possible Power Range | Preferred Power |
|---|---|---|---|
| 2 | Positive Pressure Ventilator; Centrifugal Blower | 1-5 hp | ca. 3 hp |
| 5 | Water Pump | 2-10 hp | 3-6 hp |

TABLE 1-continued

Description of pumping devices shown in FIG. 1*

| Pump | Type(s) | Possible Power Range | Preferred Power |
|---|---|---|---|
| 8 | Positive Pressure Ventilator; Centrifugal Blower | 1-5 hp | ca. 3 hp |
| 14 | Water Pump | 5-20 hp | ca. 10 hp |

Figure 4:
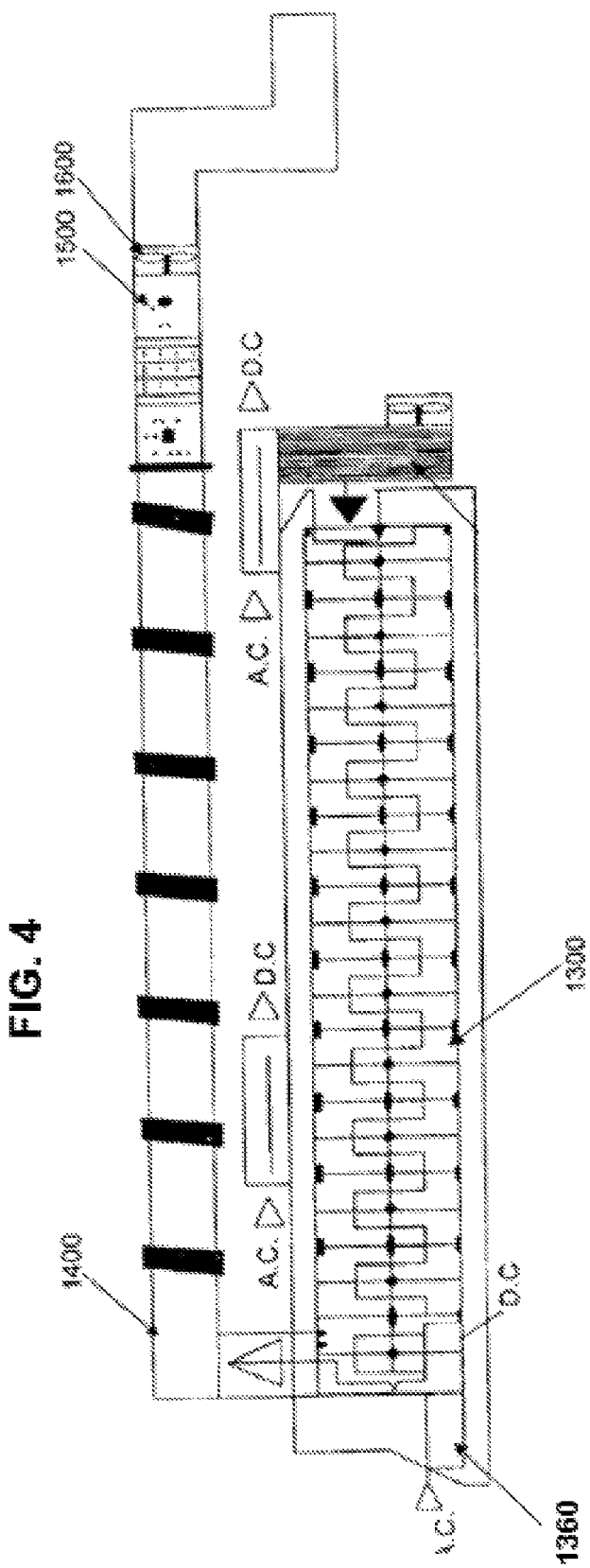
FIG. 4 is an exemplary side-on view of one embodiment of a DEMI apparatus.
Figure 5C:
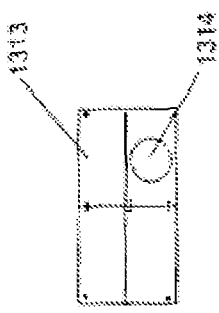
FIG. 5C is an exemplary front view of one embodiment of the electronic bombardment module of FIG. 4A.
Figure 5D:
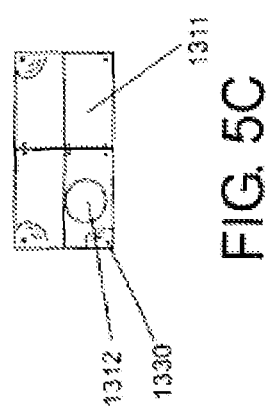
FIG. 5D is an exemplary back view of one embodiment of the electronic bombardment module of FIG. 4A.
Figure 5E:
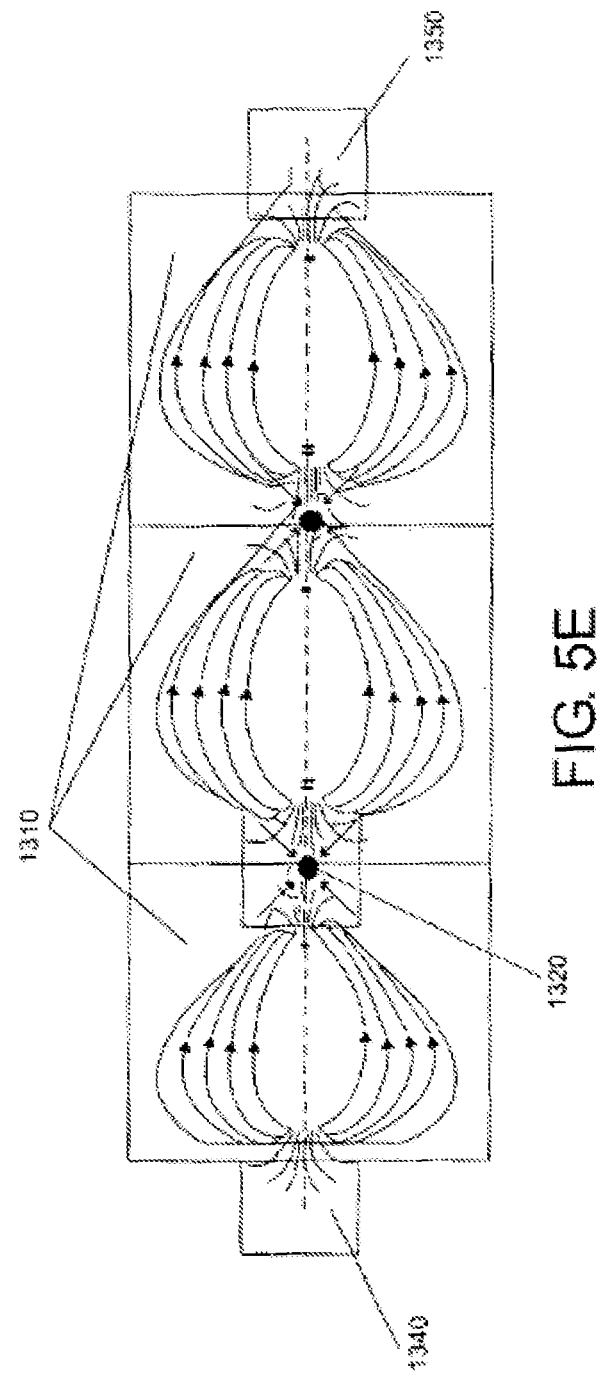
FIG. 5E is a schematic diagram of the Venturi principle used in one embodiment of the electronic bombardment module of FIG. 5A for generating turbulence.

*The pumps shown in FIG. 1 show specific individual/illustrative embodiments, and the invention is not limited by the specific position or presence of any given device As described above, many of the features of the DEMI systems are described in U.S. Pat. No. 6,709,490, which is incorporated by reference herein in its entirety for all purposes. But for the sake of completeness, several of the salient embodiments, to be considered in tandem with the Thermal Shock System, with or without the Hypothermic Reactor System are described herein. Some of the specific embodiments related to the DEMI systems are shown in FIGS. 4 to 6.

As related to some of the specific elements of the DEMI-TSS system, certain embodiments provide systems for the elimination of pollutants from an incoming, optionally high temperature, gaseous effluent stream, each said system configured to direct the gaseous effluent stream sequentially through:

(a) a thermal shock vessel (including the various embodiments described above) comprising an aqueous liquid having a mean temperature in a range of about 5° C. to about 30° C. Additional embodiments provide that the system is configured to direct the gaseous effluent stream additionally and sequentially through:

(b) an electronic bombardment module, comprising a plurality of hermetically adjoining chambers serially interconnected by means of a plurality of flow restrictors, each chamber comprising at least one set of electrodes capable of delivering a voltage in a range of from about 500 to about 80,000 voltages and an associated direct current in a range of about 2 milliamps to 2 amperes;

(c) a magnetic rearrangement module, which when operating contains a magnetic field in a range of about 0.5 milliteslas to about 3 milliteslas; and (d) an electrostatic filter;

so as to provide a pollution-reduced gas stream;

wherein the optionally high temperature gaseous effluent stream initially contains the compositions described above;

wherein the thermal shock vessel optionally (as appropriate for the temperature of the incoming gaseous stream) reduces the temperature of the gaseous stream to ambient or near ambient temperatures and acts as a filter to remove water, particles, soluble organic species, or a combination thereof, and whereupon the gas stream exiting the thermal shock vessel has a temperature comparable to that of the mean temperature of the aqueous liquid;

wherein the voltage and current applied to the gaseous stream in the electronic bombardment is sufficient to cause molecules in the gaseous stream to ionize, form molecular agglomerates, or both; and wherein the magnetic field applied to the gaseous stream in the magnetic rearrangement module is sufficient to prepare the gaseous stream for separation and removal of the ionized/agglomerated molecules in the electrostatic filtration module. Optional configurations of the Thermal Shock and Hypothermic Reactor Systems are described above.

As applied to the present invention, the DEMI system comprises several components of particular interest, including an electronic bombardment module or chamber 1300, a magnetic molecular rearrangement module or chamber 1400; and an electrostatic interaction module or chamber 1500. Each of these is described herein. As should be apparent from FIG. 1, the gas stream may be directed to make several passes through a given DEMI configuration or through a series of DEMI units, to provide a pollution-reduced gas stream of desired quality, the only real limitation being economics.

Referring to FIG. 4, the gas exiting the gas outlet 6B of the Thermal Shock System vessel is pumped into the electronic bombardment module 1300; a magnetic molecular rearrangement module 1400; an electrostatic interaction module 1500; and, a gas expulsion module 1600.

Referring to FIGS. 4 and 5A-E, electronic bombardment module 1300 may be formed by a plurality of joined hermetic chambers 1310 serially connected by a plurality of flow restrictors 1320. Said restrictors, which may be orifices and valves, preferably check valves, in addition to generating a uniform distribution of the gases in each chamber, and may provide for the formation of a Venturi type turbulence flow pattern as shown on FIG. 5E. These restrictors are also configured to direct the flow of gases so as to require the least space for the pass of gases through as most the chambers 1310 as possible. Such chambers have a dimension depending upon the volumetric flow of the gas stream and include at least a pair of elements for electronic bombardment 1330. The dimensions of the chambers are preferably such that provide a residence time of the gases in each chamber within the range of from about 0.3 to about 10 seconds. Preferably, the collocation of chambers 1310 as well as of electronic bombardment elements 1330 is defined in such a way that voltaic arcs formation or circuit breakage is avoided, maintaining a geometry that allows the generation of an adequate electronic bombardment atmosphere. In some embodiments, chambers 1310 include liquid drainage means by which the liquids that were condensed due to the electronic bombardment are eliminated.

The electronic bombardment elements 1330, may be electrically connected to a direct current source 1360 capable of providing a voltage within the range of about 50 to about 80,000 volts, and a current intensity in a range of from about 2 milliamps to about 2 amperes. In some embodiments, an alternate current to direct current rectifier is used to provide the electrical energy needed for the performance of module 1300. Preferably, the electronic bombardment is performed under such voltages and current intensities so as to provide sufficient energy to the gaseous stream to cause molecules in the gaseous stream to ionize, form molecular agglomerates, or both. The combined effect of the reduced temperature in operation and the increase in molecular weight helps promote condensation or precipitation of solids.

In certain embodiments, the electrodes of the electronic bombardment modules comprise aluminum, copper, gold, nickel, tungsten, silver, platinum, palladium, stainless steel, titanium, or combinations or alloys thereof.

As shown in FIG. 4, the magnetic molecular rearrangement module is preferably immediately adjacent to the electronic bombardment module, positioned to as to minimize the time between the respective operations of each module. The magnetic molecular rearrangement modules provide a device which subjects the gases to a magnetic field having such force that allows a rearrangement of subparticles and molecules of higher weight, and therefore, that allows a selective separation that separates the gas stream from electrostatic interaction operation. The electrostatic interaction is improved due to the selective separation made by the magnetic molecular rearrangement. Referring to FIG. 6, the magnetic molecular rearrangement module 1400, is shown to comprise a duct 1410 containing a generated magnetic field. In the embodiment under description, a duct 1410 with circular transverse section including a plurality of coils 1420 so as to form a plurality of solenoid type electromagnetic arrangements by means of the unit duct-coils. As shown in FIG. 6, the coils have a distance between themselves equivalent to the internal diameter of duct 1410, though the invention does not require this level of uniformity of distance. Electric energy is supplied to the described arrangement in such a way that a positive (south) magnetic pole 1430 is formed at the side of module 1400, which is connected to module 1300, while at the side connected to module 1500, a negative (north) magnetic pole 1440 is formed.

As described above, the magnetic rearrangement module 1400 may also include an electric current source (not shown in the Figures) that provides the electric current necessary to generate a magnetic field of 0.05 to 3 militeslas, thus achieving a rearrangement of sub-particles and heavier molecules, and therefore, a selective separation that prepares the gas stream for entrance to the electrostatic interaction module 1500.

Returning again to FIG. 4, the electrostatic interaction module 1500 generally comprises an electrostatic filter, and preferably at least two filters, each of which is electrically charged by opposite charges. In certain embodiments, the filters have a mesh in a range of about 5 to about 50 microns, preferably about 10 microns. It is also desirable to position a mechanic filter between these electrostatic filters, said mechanical filter preferably having a mesh that is in about 95% to about 98.5% less than the mesh of the electrostatically charged filters. The material used to produce the filters is any suitable of being electrically charged, preferably steel. The electrostatic interaction module 1500 also desirably includes a current source (not shown on figures) that provides the electrical current needed to generate a positive charge of +5 to +50 kV, approximately, as well as a negative charge between −5 and −50 kV, approximately. Preferably, this electric current generates a positive charge of approximately +25 KV and a negative charge of approximately −15 KV.

Finally, as related to FIG. 4, the gas expulsion module 1600, is used to generate a negative pressure at the outlet of the DEMI apparatus, to induce the outflow of the treated gases. The gas expulsion module may preferably comprise a blower driven by an electrical engine.

In additional embodiments, each of the blowers and pumps, electrical current sources, and internal sensors and alarms are interconnected by various electronic circuits and electronic protection devices that are controlled by one or more computers, in order to achieve a performance of the type considered as intrinsically safe.

To this point, the various embodiments of the present invention have been described in terms of systems for abating pollution from gaseous effluent streams. It should be appreciated that the corresponding methods are also considered part of the present invention. For example, certain embodiments of the present invention provide methods of eliminating pollutants from an incoming, optionally high temperature, gaseous effluent stream, each method comprising directing the gaseous effluent stream sequentially through:

(a) a sufficient volume of an aqueous liquid in a thermal shock vessel, such that the temperature of the gaseous effluent stream exiting the volume of liquid is in a range of about 5° C. to about 30° C., said liquid acting as filter to remove water, particles, soluble organic species, or a combination thereof from the gaseous stream; and (b) a Device for Electro Magnetic Irradiation (DEMI);

so as to provide a pollution-reduced gas stream.

Further, these methods take advantage of any or all of the system embodiments described above. That is, additional embodiments provide methods of eliminating pollutants from an incoming optionally high temperature gaseous effluent stream, each method comprising directing the gaseous effluent stream sequentially through:

(a) a sufficient volume of an aqueous liquid in a thermal shock vessel, such that the temperature of the gaseous effluent stream exiting the volume of liquid is in a range of about 5° C. to about 30° C., said liquid acting as filter to remove water, particles, soluble organic species, or a combination thereof from the gaseous stream; and optionally one or more of (b) an electronic bombardment module wherein the gaseous stream is ionized, forms molecular agglomerates, or both;

(c) a magnetic rearrangement module, operating with a magnetic field in a range of about 0.5 to about 3 milliteslas; and (d) an electrostatic filter;

so as to provide a pollution-reduced gas stream;

wherein the optionally high temperature gaseous effluent stream initially contains non-aromatic hydrocarbons and heteroatom-containing hydrocarbons (including dioxins), aromatic and polyaromatic hydrocarbons and heteroatom-containing hydrocarbons (including furans and thiophenes), carbon dioxide, carbon monoxide, oxides of nitrogen, oxides of sulfur, sulfides, fluorocarbons or fluoroethers, or any combination thereof, along with high levels of water (as stream, vapor, or droplets), solid or liquid particles, soluble or non-soluble organic species, volatile organic compounds, odors, or a combination thereof.

Typically, and as described above, the methods remove at least water, particulates, and odors from the gaseous effluent streams before these streams enter the DEMI systems. In certain embodiments, the amount of water entering the DEMI system should not exceed 250,000 ppm, through preferably these levels are much lower—i.e., less than about 25,000 ppm, less than about 10,000 ppm water, or less than about 5000 ppm water, relative to the total weight of the gaseous stream entering the DEMI system. Similarly, in some independent embodiments, the particle levels entering the DEMI system are less than 5,000 ppm, less than 1000 ppm, less than 500 ppm, less than 100 ppm, less than 50 ppm, or less than 10 ppm particles, relative to the total weight of the gaseous stream entering the DEMI system.

By applying the TSS-DEMI systems and methods of the present invention to incoming, optionally at elevated temperature, gaseous effluent streams from at least the sources described herein, it has been possible to provide pollution-reduced gas streams in which the levels of short chain hydrocarbons (e.g., methane, ethane, propane, butane, pentane) are all reduced by at least 97.5% (levels of aromatic hydrocarbons may be reduced to similar levels), where levels of CO have been reduced by at least 50%, and where $CO_2$ levels have been reduced by 75%. The pollution-reduced gas streams have also been shown to contain less than 5 ppm particles, less than 10 ppm hydrocarbons, less than 7 ppm metal oxides, and less than 25 ppm $SO_2$, or a combination thereof. These levels of reduction are higher than those reported in the '490 patent for the use of the DEMI system alone. Likewise, it is possible to reduce objectionable odors, arising, for example, from organic, bacterial, fungal, or sulfurous impurities, to undetectable or nearly undetectable levels, when measured by 5-person human panel testing.

The following embodiments are intended to complement, rather than supplant, those embodiments already described.

Embodiment 1

A system for the elimination of pollutants from an incoming, optionally high temperature, gaseous effluent stream, said system configured to direct the gaseous effluent stream sequentially through (a) a thermal shock vessel comprising an aqueous liquid having a mean temperature in a range of about 5° C. to about 30° C.; and then (b) a Device for ElectroMagnetic Irradiation (DEMI); so as to provide a pollution-reduced gas stream; wherein the optionally high temperature gaseous effluent stream initially contains non-aromatic hydrocarbons and heteroatom-containing hydrocarbons (including dioxins), aromatic and polyaromatic hydrocarbons and heteroatom-containing hydrocarbons (including furans and thiophenes), carbon dioxide, carbon monoxide, oxides of nitrogen, oxides of sulfur, sulfides, fluorocarbons or fluoroethers, or any combination thereof, along with high levels of water (as stream, vapor, or droplets), solid or liquid particles, soluble or non-soluble organic species, volatile organic compounds, odors, or a combination thereof.

Embodiment 2

A system for the elimination of pollutants from an incoming, optionally high temperature, gaseous effluent stream, said system configured to direct the gaseous effluent stream sequentially through: (a) a thermal shock vessel comprising an aqueous liquid having a mean temperature in a range of about 5° C. to about 30° C.; (b) an electronic bombardment module, comprising a plurality of hermetically adjoining chambers serially interconnected by means of a plurality of flow restrictors, each chamber comprising at least one set of electrodes capable of delivering a voltage in a range of from about 500 to about 80,000 voltages and an associated direct current in a range of about 2 milliamps to 2 amperes; and (c) a magnetic rearrangement module, which when operating contains a magnetic field in a range of about 0.5 milliteslas to about 3 milliteslas; and (d) an electrostatic filter; so as to provide a pollution-reduced gas stream; wherein the optionally high temperature gaseous effluent stream initially contains non-aromatic hydrocarbons and heteroatom-containing hydrocarbons (including dioxins), aromatic and polyaromatic hydrocarbons and heteroatom-containing hydrocarbons (including furans and thiophenes), carbon dioxide, carbon monoxide, oxides of nitrogen, oxides of sulfur, sulfides, fluorocarbons or fluoroethers, or any combination thereof, along with high levels of water (as stream, vapor, or droplets), solid or liquid particles, soluble or non-soluble organic species, volatile organic compounds, odors, or a combination thereof;

wherein the thermal shock vessel is capable of reducing the temperature of the gaseous stream to ambient or near ambient temperatures and is capable of acting as a filter to remove water, particles, soluble organic species, or a combination thereof, and whereupon the gas stream exiting the thermal shock vessel has a temperature comparable to that of the mean temperature of the aqueous liquid;

wherein the voltage and current applied to the gaseous stream in the electronic bombardment is sufficient to cause molecules in the gaseous stream to ionize, form molecular agglomerates, or both; and wherein the magnetic field applied to the gaseous stream in the magnetic rearrangement module is sufficient to prepare the gaseous stream for separation and removal of the ionized/agglomerated molecules in the electrostatic filtration module.

Embodiment 3

The system of Embodiment 1 or 2, wherein the thermal shock vessel, having top and bottom ends, comprises a gas inlet and gas outlet and is configured to introduce the gaseous effluent stream to the vessel through the gas inlet at a position proximate to the bottom end of the vessel and to remove the gaseous effluent stream from the gas outlet at a position proximate to the top end of the vessel.

Embodiment 4

The system of any one of Embodiments 1 to 3, wherein the thermal shock vessel, characterized as having upper and lower halves, said upper and lower halves distinguished by a mid-volume level of the vessel; said vessel further comprising at least one liquid inlet portal in fluid communication with the upper half of the vessel and configured to provide low temperature aqueous liquid into said vessel; said vessel further comprising at least one liquid outlet overflow portal, said outlet portal in fluid communication with the upper half of the vessel, positioned at an elevation higher than that of the at least one liquid inlet portal, said outlet portal configured to remove excess low temperature aqueous liquid from said vessel; wherein the at least one inlet portal and at least one outlet portal are optionally in fluid communication with each other, outside of the thermal shock vessel, through a heat exchanger unit.

Embodiment 5

The system of any one of Embodiments 1 to 4, wherein the thermal shock vessel, having a fustrum-shaped tapering bottom end, said fustrum-shaped tapering bottom providing a releasable opening capable of passing solids, liquids, sludge or a combination thereof.

Embodiment 6

The system of any one of Embodiments 2 to 5, wherein the gas inlet is connected to a pollution source by a conduit, so as to be in fluid communication therewith.

Embodiment 7

The system of Embodiment 6, wherein pollution source comprises an exhaust stream of an animal processing unit, a hospital or clinic, cement processing units; chemical processing plants; a mobile exhaust or stationary chimney, a coal, fuel oil, or wood burning unit, commercial kitchen, a power plant, petrochemical production facilities; pulp and paper production facilities; semiconductor processing unit, a metallurgical smelting unit, a sugar processing plant, or a trash or other organic incineration unit.

Embodiment 8

The system of Embodiment 6, wherein the conduit further comprises a junction unit coupling the incoming optionally high temperature gaseous effluent stream with a source of aqueous liquid, and configured to provide mixing of the gaseous effluent stream with the aqueous liquid before entering the gas inlet of the thermal shock vessel.

Embodiment 9

The system of any one of Embodiments 2 to 8, further characterized in that the electrostatic interaction module further includes an electrical current source capable of providing an electrical current needed for generating a positive charge of in a range of from about +5 to about +50 kV and separately a negative charge of in a range of about −5 to about −50 kV.

Embodiment 10

The system of Embodiment 9, wherein the electrical current source is capable of providing the electrical current needed for generating a positive charge of about +25 and separately a negative charge of about −15 kV.

Embodiment 11

The system of any one of Embodiments 2 to 10, wherein the electrodes of the electronic bombardment modules comprise aluminum, copper, gold, nickel, tungsten, silver, platinum, palladium, stainless steel, titanium, or combinations or alloys thereof.

Embodiment 12

The system of any one of Embodiments 2 to 11, wherein at least one of the flow restrictors of the electronic bombardment chambers is an orifice or check valve capable of promoting the formation of Venturi type turbulence within a given chamber.

Embodiment 13

The system of any one of Embodiments 2 to 12, wherein the electrostatic filter comprises at least one pair of oppositely charged filters, said filters preferably having a mesh in a range of about 5 microns to about 50 microns.

Embodiment 14

The system of any one of Embodiments 1 to 13, said system being capable of providing the pollution-reduced gas stream having:
(a) less than 10 wt %, less than 5 wt %, less than 2.5 wt %, less than 1 wt %, or less than 0.5 wt % of the hydrocarbons present in the incoming, optionally high temperature, gaseous effluent stream; or
(b) less than 10 wt %, less than 5 wt %, less than 2.5 wt %, less than 1 wt %, or less than 0.5 wt % of the oxides of nitrogen present in the incoming, optionally high temperature, gaseous effluent stream; or
(c) less than 10 wt %, less than 5 wt %, less than 2.5 wt %, less than 1 wt %, or less than 0.5 wt % of the oxides of sulfur present in the incoming, optionally high temperature, gaseous effluent stream;
(d) less than 40 wt %, less than 35 wt %, less than 30 wt %, less than 25 wt %, less than 20 wt %, less than 15 wt %, or less than 10 wt % of the $CO_2$ present in the incoming, optionally high temperature, gaseous effluent stream; or (e) a combination of two or more of (a) to (d), each wt % relative to the total weight of the pollution-reduced gas stream.

Embodiment 15

A method of eliminating pollutants from an incoming optionally high temperature gaseous effluent stream, said method comprising directing the gaseous effluent stream sequentially through: (a) a sufficient volume of an aqueous liquid in a thermal shock vessel, such that the temperature of the gaseous effluent stream exiting the volume of liquid is in a range of about 5° C. to about 30° C., said liquid acting as filter to remove water, particles, soluble organic species, or a combination thereof from the gaseous stream; and (b) a Device for ElectroMagnetic Irradiation (DEMI); so as to provide a pollution-reduced gas stream; wherein the optionally high temperature gaseous effluent stream initially contains impurities comprising non-aromatic hydrocarbons and heteroatom-containing hydrocarbons (including dioxins), aromatic and polyaromatic hydrocarbons and heteroatom-containing hydrocarbons (including furans and thiophenes), carbon dioxide, carbon monoxide, oxides of nitrogen, oxides of sulfur, sulfides, fluorocarbons or fluoroethers, or any combination thereof, along with high levels of water (as stream, vapor, or droplets), solid or liquid particles, soluble or non-soluble organic species, volatile organic compounds, odors, or a combination thereof; such that level of at least one of the impurities is reduced at least 40 wt %, at least 60 wt %, at least 75 wt %, at least 90 wt %, or at least 95 wt % after applying the method, relative to the incoming effluent stream.

Embodiment 16

A method of eliminating pollutants from an incoming optionally high temperature gaseous effluent stream, said method comprising directing the gaseous effluent stream sequentially through: (a) a sufficient volume of an aqueous liquid in a thermal shock vessel, such that the temperature of the gaseous effluent stream exiting the volume of liquid is in a range of about 5° C. to about 30° C., said liquid acting as filter to remove water, particles, soluble organic species, or a combination thereof from the gaseous stream; such that the stream exiting the liquid and entering the DEMI unit contains less than 250,000 ppm water or 5,000 ppm particles or both; (b) an electronic bombardment module wherein the gaseous stream is ionized, forms molecular agglomerates, or both; (c) a magnetic rearrangement module, operating with a magnetic field in a range of about 0.5 to about 3 milliteslas; and (d) an electrostatic filter; so as to provide a pollution-reduced gas stream; wherein the optionally high temperature gaseous effluent stream initially contains non-aromatic hydrocarbons and heteroatom-containing hydrocarbons (including dioxins), aromatic and polyaromatic hydrocarbons and heteroatom-containing hydrocarbons (including furans and thiophenes), carbon dioxide, carbon monoxide, oxides of nitrogen, oxides of sulfur, sulfides, fluorocarbons or fluoroethers, or any combination thereof, along with high levels of water (as stream, vapor, or droplets), solid or liquid particles, soluble or non-soluble organic species, volatile organic compounds, odors, or a combination thereof.

Embodiment 17

The method of Embodiment 15 or 16, wherein the gaseous effluent stream is directed to flow vertically through the volume of aqueous liquid in the thermal shock vessel.

Embodiment 18

The method of any one of Embodiments 15 to 17, wherein the optionally high temperature gaseous effluent stream originates from an exhaust stream of an animal processing unit, a hospital or clinic, a mobile or stationary chimney, a coal or wood burning unit, commercial kitchen, a power plant, semiconductor processing unit, a smelting unit, a sugar processing plant, or a trash or other organic incineration unit.

Embodiment 19

The method of any one of Embodiments 15 to 18, wherein the incoming optionally high temperature gaseous effluent stream is mixed with a source of aqueous liquid before entering the aqueous liquid in the thermal shock vessel.

Embodiment 20

The method of any one of Embodiments 16 to 19, wherein the electronic bombardment module, comprises a plurality of hermetically adjoining chambers serially interconnected by means of a plurality of flow restrictors, each chamber comprising at least one set of electrodes capable of delivering a voltage in a range of from about 500 to about 80,000 voltages and an associated direct current in a range of about 2 milliamps to 2 amperes.

Embodiment 21

The method of any one of Embodiments 16 to 20, wherein the electrostatic interaction module is capable of providing an electrical current needed for generating a positive charge of in a range of from about +5 to about +50 kV and separately a negative charge of in a range of about −5 to about −50 kV.

Embodiment 22

The method of Embodiment 21, wherein the electrostatic interaction module is capable of providing the electrical current needed for generating a positive charge of about +25 and separately a negative charge of about −15 kV.

Embodiment 23

The method of any one of Embodiments 16 to 22, wherein the electrodes of the electronic bombardment modules comprise copper, gold, nickel, tungsten, silver, platinum, palladium, stainless steel, or combinations or alloys thereof.

Embodiment 24

The method of any one of Embodiments 20 to 23, wherein at least one of the flow restrictors of the electronic bombardment chambers is an orifice or check valve capable of promoting the formation of Venturi type turbulence within a given chamber.

Embodiment 25

The method of any one of Embodiments 16 to 24, wherein the electrostatic filter comprises at least one pair of oppositely charged filters, said filters preferably having a mesh in a range of about 5 microns to about 50 microns.

Embodiment 26

The method of any one of Embodiments 15 to 25, wherein the gas stream entering (b) comprises less than 25,000 ppm water, less than 10 ppm particles having a mean diameter greater than 0.01 micron, or both.

Embodiment 27

The method of any one of Embodiments 15 to 26, wherein the pollution-reduced gas stream contains:
  (a) less than less than 25,000 ppm, less than 10,000 ppm, less than 5000 ppm, or less than 1000 ppm by weight water; or
  (b) less than 5 ppm, less than 2 ppm, less than 1 ppm, or less than 0.1 ppm by weight particles having a mean diameter greater than 0.01 microns; or
  (c) less than 50 ppm, less than 25 ppm, less than 10 ppm, or less than 5 ppm by weight hydrocarbons; or
  (d) less than 50 ppm, less than 25 ppm, less than 10 ppm by weight $SO_2$;
  (e) less than 50 ppm, less than 25 ppm, less than 10 ppm by weight $NO_2$;
  (f) less than 500 ppm, less than 250 ppm, less than 100 ppm, less than 50 ppm, less than 10 ppm by weight $CO_2$;
  (g) less than 50 ppm, less than 25 ppm, less than 10 ppm, less than 5 ppm, less than 1 ppm by weight CO;
  (h) or a combination thereof, each ppm by weight relative to the total weight of the pollution-reduced gas stream.

Embodiment 28

The method of any one of Embodiments 15 to 27, wherein the pollution-reduced gas stream contains
  (a) less than 10 wt %, less than 5 wt %, less than 2.5 wt %, less than 1 wt %, or less than 0.5 wt % of the hydrocarbons present in the incoming, optionally high temperature, gaseous effluent stream; or
  (b) less than 10 wt %, less than 5 wt %, less than 2.5 wt %, less than 1 wt %, or less than 0.5 wt % of the oxides of nitrogen present in the incoming, optionally high temperature, gaseous effluent stream; or
  (c) less than 10 wt %, less than 5 wt %, less than 2.5 wt %, less than 1 wt %, or less than 0.5 wt % of the oxides of sulfur present in the incoming, optionally high temperature, gaseous effluent stream;
  (d) less than 40 wt %, less than 35 wt %, less than 30 wt %, less than 25 wt %, less than 20 wt %, less than 15 wt %, or less than 10% of the $CO_2$ present in the incoming, optionally high temperature, gaseous effluent stream; or
  (e) a combination of two or more of (a) to (c), each wt % relative to the total weight of the pollution-reduced gas stream.

EXAMPLES

The following Examples are provided to illustrate some of the concepts described within this disclosure. While each Example is considered to provide specific individual embodiments of the methods using the device, none of the Examples should be considered to limit the more general embodiments described herein.

Table 2 illustrates the principle pollutants for a range of illustrative industries where the present invention provides suitable pollution abatement.

TABLE 2

Principle Green House Gas Producing Industries

| Industry | Principle Pollutants* |
|---|---|
| Coal burning power plant | CO, $CO_2$, Hg, $NO_x$, $SO_x$, PM |
| Gas burning power plant | CO, $CO_2$, $NO_x$ |
| Cement production | $CO_2$, Hg, $NO_x$, $SO_x$, PM |
| Petrochemicals processing | $CO_2$, $NO_x$, $SO_x$, VOCs |
| Pulp and paper production | $CO_2$, $NO_x$, $SO_x$, PM, VOCs |
| Steel production | $CO_2$, $NO_x$, $SO_x$, PM |
| Copper smelting | $CO_2$, $NO_x$, $SO_x$, PM |

*$NO_x$ and $SO_x$ are oxides of nitrogen and sulfur, respectively; PM is particulate matter; VOCs are Volatile Organic Compounds Table 3 illustrates the types of reductions in these pollutants achievable by the systems and methods of the present invention.

TABLE 3

Representative Reductions Observed Using Systems and Methods of the Present Disclosure

| Compounds | % Reductions |
|---|---|
| CO | 40 to 60 wt % |
| $CO_2$ | 60 to 80 wt % |
| NOx | >95 wt % |
| SOx | >95 wt % |
| Mercury, Hg | 90 wt % |
| VOC | 95 wt % |
| Particulate Matter, >0.01 microns | >98 wt % |

*$NO_x$ and $SO_x$ are oxides of nitrogen and sulfur, respectively; PM is particulate matter; VOCs are Volatile Organic Compounds The following five examples are provided to show the efficiency improvements realized by the addition of the TSS system to the DEMI unit to the efficiency of the pollution controls. Not shown are the improvements in the operating lifetimes of the DEMI unit with the addition of the TSS unit. The addition of the TSS system to the DEMI unit can add 1, 2, 3, 4, or even 5 years of uninterrupted service, relative to a comparable system without the TSS system. Hydrocarbons were analyzed using affinity gas chromatography (Poropak-N or AT-1000 columns). $CO_2$, CO, and $SO_2$ were analyzed using standard gas analyzers or gas chromatographic equipment.

Example 1

Slaughterhouse

Exposure of organic residual parts to a boiling limited period resulted in the formation of emissions rich in water saturation (>95%) and ammonia ($NH_4$). These properties required the sequential passage of the column through TSS and DEMI's preparative and resolutive systems. TSS included a 4 K liter capacity cylinder and a series of mechanical pumps and blowers able to direct the column at a controlled velocity through different steps of the system. The operating parameters and results for this application are provided here:

| Operating Parameter | Slaughterhouse |
|---|---|
| Volumetric Flow | 2750-3200 $m^3$/h |
| Exit gas temperature | 150° C. |
| Operation time period[a] | 10 months |
| Mass Flow | 12 m/s |
| Nominal water saturation | 95-97% |
| Chimney Diameter | 12" |

[a]Operating with DEMI + TSS; water saturation levels would cause failure with DEMI alone (i.e., without TSS)

| High Protein Flour From Animal Parts (Slaughterhouse) | | | |
|---|---|---|---|
| Parameters | Control | w/DEMI only | TSS + DEMI |
| $H_2O$ Sat | 999,000 ppm | Operating at 30% | 25 ppm |
| Temp | 150° C. | Fail | 24° C. |
| $CO_2$ | 40 ppm | Fail | ca. 8 ppm |
| CO | 6 ppm | Fail | 0 ppm |
| Total Suspended Particles | 1700 ppm | Fail | 0-1 ppm |

Example 2

Ammonium Sulfate Processing Plant

Fumes being exhausted were directed to a Preparative DEMI unit with weight of 520 kg and a capacity of 3.2 $m^3$/sec. Additional operating parameters and results for this application are provided here:

| Operating Parameter | Ammonium Sulfate Plant |
|---|---|
| Volumetric Flow | 4500 $m^3$/h |
| Gas temperature | 70° C. |
| Operation time period[a] | 1 day |
| Mass Flow | 16 m/s |
| Nominal water saturation | 27% |
| Chimney Diameter | 8" |

[a]Operating with DEMI only; results for DEMI + TSS are projected

| AMMONIUM SULPHATE PROCESSING PLANT | | | |
|---|---|---|---|
| Parameters | Control | w/DEMI only | TSS + DEMI |
| $H_2O$ Sat | 250,000 ppm | 25,000 ppm | 25 ppm |
| Temp | 70° C. | 24° C. | 22° C. |
| $SO_2$ | 1350 ppm | 50 ppm | 10 ppm |
| Total Suspended Particles | 60 ppm | 7 ppm | 0 ppm |
| Sulfates | ND | 79 g/L | Trace |
| Sulfites | ND | 320 g/L | Trace |
| Ammonia | ND | 353 g/L | Trace |

Example 3

Tire Production Plant

Emissions resulting from the vulcanizing of primed rubber were directed, using 10 HP mechanical blowers, into a 520 kg weight DEMI resolutive unit able to handle 3.2 $m^3$/sec with and without passing through a TSS first.

| Operating Parameter | Tire production |
|---|---|
| Volumetric Flow | 3000 $m^3$/h |
| Gas temperature | 40° C. |
| Operation time period | 14 years [a] |
| Mass Flow | 5-7 m/s |
| Nominal water saturation | 12% |
| Chimney Diameter | 10" |

[a] Operating with DEMI only; results for DEMI + TSS are projected

| TIRE CHAMBER PRODUCTION PLANT | | | |
|---|---|---|---|
| Parameters | Control | w/DEMI only | TSS + DEMI |
| $H_2O$ Sat | 100,000 ppm | 4% | <2.5% |
| Temp | 40° C. | 25° C. | 20° C. |
| $CO_2$ | 850 ppm | 340 ppm | 170 ppm |
| CO | 25 ppm | 15 ppm | 10 ppm |
| HC (Short Chain) | 315 ppm | 4-5 ppm | 4 ppm |
| HC (Long Chain) | 20 ppm | 2 ppm | 1 ppm |
| $SO_2$ | 50 ppm | 2-5 ppm | 2 ppm |
| Total Suspended Particles | 100% (relative) | 10% | 0.50% |

Example 4

Coal Fired Power Plant 500 MW

Based on the Applicant's experience with the inventive system, the following results are reasonably projected for treating the effluent of a 500 MW coal fired power plant:

| Parameters | Control | w/DEMI only | TSS + DEMI | Reduction % |
|---|---|---|---|---|
| Pressure[a] | 100% | 40% | 25% | 75% |
| $H_2O$ Saturation | 30% | 10-15% | 2.5% | 83% |
| Temperature | 150° C. | 60-70° C. | 20-22° C. | 85% |
| $CO_2$ | 6.6 ton/min | 2.6-3.4 ton/min | 1.3-2 ton/min | 70-80% |
| CO | 1.3 kg/min | 0.8 kg/min | 0.5 kg/min | 60% |
| $NO_x$ | 19.5 kg/min | 4.9 kg/min | 1.0 kg min | 95% |
| $SO_2$ | 26.8 kg/min | 1.3 kg/min | 1.1 kg/min | 96% |
| Hg | 0.21 kg/day | 0.03 kg/day | 0.02 kg/day | 90% |
| PM | 1243 kg/day | NA[b] | 20 kg/day | 98.5% |

[a]Pressure which the gas enters the system on each stage
[b]Not Applicable

Example 5

Cement Plant

Based on the Applicant's experience with the inventive system, the following results are reasonably projected for treating the effluent of a cement plant. Note that the effluent from the cement plant, at ca. 70 wt % water, would cause early failure of a DEMI-only plant:

| Parameters | Control | w/DEMI only | TSS + DEMI | Reduction % |
|---|---|---|---|---|
| Production Volume | 200 ton/h | NA | NA | NA |
| Pressure | 585 mm Hg | Fail | 147 mm Hg | 75% |
| Mass flow | 18 m/s | NA | NA | NA |
| Volumetric Flow | 26.1 m³/s | NA | NA | NA |
| $H_2O$ Saturation | 70% | NA | 2.5 | 95% |
| Temperature | 76-176° K. | Fail | 20° K. | 87% |
| $CO_2$ | 1850 kg/h | Fail | 70 kg/h | 70-80% |
| CO | 77 kg/h | Fail | 31 kg/h | 60% |
| NOx | 5.1 kg/h | Fail | 0.3 kg/h | 95% |
| VOC | 5.2 kg/h | Fail | 0.07 kg/h | 95% |
| PM | 1.9 kg/h | Fail | 0.03 kg/h | 98.5% |

As those skilled in the art will appreciate, numerous modifications and variations of the present invention are possible in light of these teachings, and all such are contemplated hereby. For example, in addition to the embodiments described herein, the present invention contemplates and claims those inventions resulting from the combination of features of the invention cited herein and those of the cited prior art references which complement the features of the present invention. Similarly, it will be appreciated that any described material, feature, or article may be used in combination with any other material, feature, or article, and such combinations are considered within the scope of this invention.

The disclosures of each patent, patent application, and publication cited or described in this document are hereby incorporated herein by reference, each in its entirety, for all purposes.

What is claimed:

1. A system for the elimination of pollutants from an incoming, optionally high temperature, gaseous effluent stream, said system configured to direct the gaseous effluent stream sequentially through
   (a) a thermal shock vessel comprising an aqueous liquid having a mean temperature in a range of about 5° C. to about 30° C.; and then
   (b) a Device for ElectroMagnetic Irradiation (DEMI);
   so as to provide a pollution-reduced gas stream;
   wherein the optionally high temperature gaseous effluent stream initially contains non-aromatic hydrocarbons, aromatic and polyaromatic hydrocarbons, carbon dioxide, carbon monoxide, oxides of nitrogen, oxides of sulfur, sulfides, fluorocarbons or fluoroethers, or any combination thereof, along with high levels of water vapor, water droplets, or steam, solid or liquid particles, soluble or non-soluble organic species, volatile organic compounds, odors, or a combination thereof.

2. The system of claim 1, said system configured to direct the gaseous effluent stream sequentially through:
   (a) a thermal shock vessel comprising an aqueous liquid having a mean temperature in a range of about 5° C. to about 30° C.;
   (b) an electronic bombardment module, comprising a plurality of hermetically adjoining chambers serially interconnected by means of a plurality of flow restrictors, each chamber comprising at least one set of electrodes capable of delivering a voltage in a range of from about 500 to about 80,000 volts and an associated direct current in a range of about 2 milliamps to 2 amperes; and
   (c) a magnetic rearrangement module, which when operating contains a magnetic field in a range of about 0.5 milliteslas to about 3 milliteslas; and
   (d) an electrostatic filter;
   so as to provide a pollution-reduced gas stream;
   wherein the optionally high temperature gaseous effluent stream initially contains non-aromatic hydrocarbons, aromatic and polyaromatic hydrocarbons, carbon dioxide, carbon monoxide, oxides of nitrogen, oxides of sulfur, sulfides, fluorocarbons or fluoroethers, or any combination thereof, along with high levels of water vapor, water droplets, or steam, solid or liquid particles, soluble or non-soluble organic species, volatile organic compounds, odors, or a combination thereof;
   wherein the thermal shock vessel is capable of reducing the temperature of the gaseous stream to ambient or near ambient temperatures and is capable of acting as a filter to remove water, particles, soluble organic species, or a combination thereof, and whereupon the gas stream exiting the thermal shock vessel has a temperature comparable to that of the mean temperature of the aqueous liquid;

wherein the voltage and current applied to the gaseous stream in the electronic bombardment is sufficient to cause molecules in the gaseous stream to ionize, form molecular agglomerates, or both; and wherein the magnetic field applied to the gaseous stream in the magnetic rearrangement module is sufficient to prepare the gaseous stream for separation and removal of the ionized/agglomerated molecules in the electrostatic filtration module.

3. The system of claim 1, wherein the thermal shock vessel, having top and bottom ends, comprises a gas inlet and gas outlet and is configured to introduce the gaseous effluent stream to the vessel through the gas inlet at a position proximate to the bottom end of the vessel and to remove the gaseous effluent stream from the gas outlet at a position proximate to the top end of the vessel.

4. The system of claim 1, wherein the thermal shock vessel, characterized as having upper and lower halves, said upper and lower halves distinguished by a mid-volume level of the vessel;

said vessel further comprising at least one liquid inlet portal in fluid communication with the upper half of the vessel and configured to provide low temperature aqueous liquid into said vessel;

said vessel further comprising at least one liquid outlet overflow portal, said outlet portal in fluid communication with the upper half of the vessel, positioned at an elevation higher than that of the at least one liquid inlet portal, said outlet portal configured to remove excess low temperature aqueous liquid from said vessel;

wherein the at least one inlet portal and at least one outlet portal are optionally in fluid communication with each other, outside of the thermal shock vessel, through a heat exchanger unit.

5. The system of claim 1, wherein the thermal shock vessel, having a fustrum-shaped tapering bottom end, said fustrum-shaped tapering bottom providing a releasable opening capable of passing solids, liquids, sludge or a combination thereof.

6. The system of claim 3, wherein the gas inlet is connected to a pollution source by a conduit, so as to be in fluid communication therewith.

7. The system of claim 6, wherein pollution source comprises an exhaust stream of an animal processing unit, a hospital or clinic, cement processing units; chemical processing plants; a mobile exhaust or stationary chimney, a coal, fuel oil, or wood burning unit, commercial kitchen, a power plant, petrochemical production facilities; pulp and paper production facilities; semiconductor processing unit, a metallurgical smelting unit, a sugar processing plant, or a trash or other organic incineration unit.

8. The system of claim 6, wherein the conduit further comprises a junction unit coupling the incoming optionally high temperature gaseous effluent stream with a source of aqueous liquid, and configured to provide mixing of the gaseous effluent stream with the aqueous liquid before entering the gas inlet of the thermal shock vessel.

9. The system of claim 2, further characterized in that the electrostatic interaction module further includes an electrical current source capable of providing an electrical current needed for generating a positive charge of in a range of from about +5 to about +50 kV and separately a negative charge of in a range of about −5 to about −50 kV.

10. The system of claim 9, wherein the electrical current source is capable of providing the electrical current needed for generating a positive charge of about +25 and separately a negative charge of about −15 kV.

11. The system of claim 2, wherein the electrodes of the electronic bombardment modules comprise aluminum, copper, gold, nickel, tungsten, silver, platinum, palladium, stainless steel, titanium, or combinations or alloys thereof.

12. The system of claim 2, wherein at least one of the flow restrictors of the electronic bombardment chambers is an orifice or check valve capable of promoting the formation of Venturi type turbulence within a given chamber.

13. The system of claim 2, wherein the electrostatic filter comprises at least one pair of oppositely charged filters, said filters preferably having a mesh in a range of about 5 microns to about 50 microns.

14. The system of claim 1, said system being capable of providing the pollution-reduced gas stream having less than 25 ppm water, or less than 5 ppm particles greater than 0.1 microns in diameter, or less than 10 ppm of hydrocarbons or less than 5 ppm of the oxides of nitrogen or less than 5 ppm of the oxides of sulfur, or a combination thereof, each ppm relative to the total weight of the pollution-reduced gas stream.

15. The system of any one of claim 1, said system being capable of providing the pollution-reduced gas stream having:

(a) about 10 wt % or less than the hydrocarbons present in the incoming, optionally high temperature, gaseous effluent stream; or (b) about 10 wt % or less than the oxides of nitrogen present in the incoming, optionally high temperature, gaseous effluent stream; or (c) about 10 wt % or less than the oxides of sulfur present in the incoming, optionally high temperature, gaseous effluent stream; or (d) about 40 wt % or less than the $CO_2$ present in the incoming, optionally high temperature, gaseous effluent stream; or (e) a combination of two or more of (a) to (d), each wt % relative to the total weight of the pollution-reduced gas stream.

16. A method of eliminating pollutants from an incoming optionally high temperature gaseous effluent stream, said method comprising directing the gaseous effluent stream sequentially through:

(a) a sufficient volume of an aqueous liquid in a thermal shock vessel, such that the temperature of the gaseous effluent stream exiting the volume of liquid is in a range of about 5° C. to about 30° C., said liquid acting as filter to remove water, particles, soluble organic species, or a combination thereof from the gaseous stream; and (b) a Device for Electro Magnetic Irradiation (DEMI);

so as to provide a pollution-reduced gas stream;

wherein the optionally high temperature gaseous effluent stream initially contains impurities comprising non-aromatic hydrocarbons, aromatic and polyaromatic hydrocarbons, carbon dioxide, carbon monoxide, oxides of nitrogen, oxides of sulfur, sulfides, fluorocarbons or fluoroethers, or any combination thereof, along with high levels of water vapor, water droplets, or steam, solid or liquid particles, soluble or non-soluble organic species, volatile organic compounds, odors, or a combination thereof; such that level of at least one of the impurities is reduced at least 40%.

17. The method of claim 16, said method comprising directing the gaseous effluent stream sequentially through:

(a) a sufficient volume of an aqueous liquid in a thermal shock vessel, such that the temperature of the gaseous effluent stream exiting the volume of liquid is in a range of about 5° C. to about 30° C., said liquid acting as filter to remove water, particles, soluble organic species, or a combination thereof from the gaseous stream; such that the stream exiting the liquid and entering the DEMI unit contains less than 250,000 ppm water or 5,000 ppm particles or both:
(b) an electronic bombardment module wherein the gaseous stream is ionized, forms molecular agglomerates, or both;
(c) a magnetic rearrangement module, operating with a magnetic field in a range of about 0.5 to about 3 milliteslas; and
(d) an electrostatic filter;
so as to provide a pollution-reduced gas stream;
wherein the optionally high temperature gaseous effluent stream initially contains non-aromatic hydrocarbons, aromatic and polyaromatic hydrocarbons, carbon dioxide, carbon monoxide, oxides of nitrogen, oxides of sulfur, sulfides, fluorocarbons or fluoroethers, or any combination thereof, along with high levels of water vapor, water droplets, or steam, solid or liquid particles, soluble or non-soluble organic species, volatile organic compounds, odors, or a combination thereof.

18. The method of claim 16, wherein the gaseous effluent stream is directed to flow vertically through the volume of aqueous liquid in the thermal shock vessel.

19. The method of claim 16, wherein the optionally high temperature gaseous effluent stream originates from an exhaust stream of an animal processing unit, a hospital or clinic, cement processing units; chemical processing plants; a mobile exhaust or stationary chimney, a coal, fuel oil, or wood burning unit, commercial kitchen, a power plant, petrochemical production facilities; pulp and paper production facilities; semiconductor processing unit, a metallurgical smelting unit, a sugar processing plant, or a trash or other organic incineration unit.

20. The method of claim 16, wherein the incoming optionally high temperature gaseous effluent stream is mixed with a source of aqueous liquid before entering the aqueous liquid in the thermal shock vessel.

21. The method of claim 17, wherein the electronic bombardment module, comprises a plurality of hermetically adjoining chambers serially interconnected by means of a plurality of flow restrictors, each chamber comprising at least one set of electrodes capable of delivering a voltage in a range of from about 500 to about 80,000 volts and an associated direct current in a range of about 2 milliamps to 2 amperes.

22. The method of claim 17, wherein the electrostatic interaction module is capable of providing an electrical current needed for generating a positive charge of in a range of from about +5 to about +50 kV and separately a negative charge of in a range of about −5 to about −50 kV.

23. The method of claim 22, wherein the electrostatic interaction module is capable of providing the electrical current needed for generating a positive charge of about +25 and separately a negative charge of about −15 kV.

24. The method of claim 17, wherein the electrodes of the electronic bombardment modules comprise copper, gold, nickel, tungsten, silver, platinum, palladium, stainless steel, or combinations or alloys thereof.

25. The method of claim 17, wherein at least one of the flow restrictors of the electronic bombardment chambers is an orifice or check valve capable of promoting the formation of Venturi type turbulence within a given chamber.

26. The method of claim 17, wherein the electrostatic filter comprises at least one pair of oppositely charged filters, said filters preferably having a mesh in a range of about 5 microns to about 50 microns.

27. The method of claim 16, wherein the gas stream entering (b) comprises less than 25,000 ppm water, less than 10 ppm particles having a mean diameter greater than 0.01 micron, or both.

28. The method of claim 16, wherein the pollution-reduced gas stream contains:
(a) less than about 25,000 ppm by weight water; or
(b) less than about 5 ppm by weight particles having a mean diameter greater than 0.01 microns; or
(c) less than about 25 ppm by weight hydrocarbons; or
(d) less than about 25 ppm by weight $SO_2$;
(e) less than about 25 ppm by weight $NO_2$;
(f) less than 100 ppm by weight $CO_2$;
(g) less than 5 ppm by weight CO;
(f) or a combination thereof, each ppm by weight relative to the total weight of the pollution-reduced gas stream.

29. The method of claim 16, wherein the pollution-reduced gas stream contains
(a) about 10 wt % or less than the hydrocarbons present in the incoming, optionally high temperature, gaseous effluent stream; or
(b) about 10 wt % or less than the oxides of nitrogen present in the incoming, optionally high temperature, gaseous effluent stream; or
(c) about 10 wt % or less than the oxides of sulfur present in the incoming, optionally high temperature, gaseous effluent stream; or
(d) about 40 wt % or less than the $CO_2$ present in the incoming, optionally high temperature, gaseous effluent stream or
(e) a combination of two or more of (a) to (d), each wt % relative to the total weight of the pollution-reduced gas stream.

* * * * *